(12) United States Patent
Li (10) Patent No.: US 12,362,693 B2
(45) Date of Patent: Jul. 15, 2025

(54) METHOD OF ADJUSTING MOTOR CONTROL VOLTAGES FOR A PERMANENT MAGNET ROTOR MOTOR

(71) Applicant: KINETIC TECHNOLOGIES INTERNATIONAL HOLDINGS LP, Toronto (CA)

(72) Inventor: Kwei Chung Li, Kowloon (HK)

(73) Assignee: Kinetic Technologies International Holdings LP, Toronto (CA)

( * ) Notice: Subject to any disclaimer, the term of this patent is extended or adjusted under 35 U.S.C. 154(b) by 127 days.

(21) Appl. No.: 18/206,565

(22) Filed: Jun. 6, 2023

(65) Prior Publication Data

US 2024/0413772 A1 Dec. 12, 2024

(51) Int. Cl.
*B64D 27/24* (2024.01)
*H02P 21/18* (2016.01)
*H02P 27/06* (2006.01)

(52) U.S. Cl.
CPC .............. *H02P 21/18* (2016.02); *H02P 27/06* (2013.01); *H02P 2207/05* (2013.01)

(58) Field of Classification Search
CPC ...... H02P 21/18; H02P 27/06; H02P 2207/05; B64D 27/24; H02M 1/15
See application file for complete search history.

(56) References Cited

U.S. PATENT DOCUMENTS

| 2018/0367024 A1* | 12/2018 | Kim | H02M 1/15 |
| 2019/0207543 A1* | 7/2019 | Lan | B64D 27/24 |
| 2023/0023055 A1* | 1/2023 | Kulkarni | H02P 21/10 |

OTHER PUBLICATIONS

"Sensorless PMSM Field-Oriented Control," Freescale Semiconductor, Document No. DRM148, 2016.
Jorge Zambada, "Sensorless Field Oriented Control of PMSM Motors", Microchip Technology Inc., AN1078, 2007, pp. 1-30.

(Continued)

*Primary Examiner* — Cortez M Cook
(74) *Attorney, Agent, or Firm* — Sheppard Mullin Richter & Hampton LLP (57) ABSTRACT

A method of adjusting motor control voltages for a permanent magnet rotor motor comprising three phase coils, each phase coil having two free ends, the three phase coils being without a common node. The method comprises driving the motor by applying motor control voltages in turn to respective pairs of the three phase coils with a remaining one of the three phase coils not being driven. Then, determining for each of the pairs of the three phase coils respective values of a motor operating parameter. The values of the motor operating parameter are compared and, based on said comparison, three-phase stationary reference frame motor control voltages $v_a$, $v_b$, $v_c$ generated for driving the coils in a field-oriented control (FOC) mode of operation are adjusted to provide adjusted three-phase stationary reference frame motor control voltages $v'_a$, $v'_b$, $v'_c$ for driving the coils in the FOC mode of operation.

18 Claims, 8 Drawing Sheets

(56) References Cited

OTHER PUBLICATIONS

Wei Xu et al., "Improved Rotor Flux Observer for Sensorless Control of PMSM with Adaptive Harmonic Elimination and Phase Compensation," CES Transactions on Electrical Machines and Systems, vol. 3, No. 2, Jun. 2019, pp. 151-159.

* cited by examiner

PRIOR ART

Fig. 3

PRIOR ART

METHOD OF ADJUSTING MOTOR CONTROL VOLTAGES FOR A PERMANENT MAGNET ROTOR MOTOR

FIELD OF THE INVENTION

The invention relates to a method of adjusting motor control voltages for a permanent magnet rotor motor. The invention relates particularly, but not inclusively, to a permanent magnet synchronous motor (PMSM) with independent phase coils and to a method of balancing motor control voltages or stator coil torque.

BACKGROUND OF THE INVENTION

The most common types of multi-phase, e.g., three-phase, motors are synchronous motors and induction motors. When three-phase electric conductors are placed in certain geometrical positions, which means at a certain angle from one another, an electrical field is generated. The rotating magnetic field rotates at a certain speed known as synchronous speed. If a permanent magnet or electromagnet is present in this rotating magnetic field, the magnet is magnetically locked with the rotating magnetic field and consequently rotates at the same speed as the rotating field which results in a synchronous motor, as the speed of the rotor of the motor is the same as the speed of the rotating magnetic field.

A permanent magnet motor uses permanent magnets in the rotor to provide a constant magnetic flux which typically has a sinusoidal back-electromotive force (emf) signal. The rotor locks in when the speed of the rotating magnetic field in the stator is at or near synchronous speed. The stator carries windings which are connected to a controller having a power stage including a voltage supply, typically an alternating current (AC) voltage supply, to produce the rotating magnetic field. Such an arrangement constitutes a PMSM.

PMSMs are similar to brushless direct current (BLDC) motors and to brushed direct current (BDC) motors. BLDC motors can be considered as synchronous DC motors which use a controller having a power stage including a DC voltage supply, suitably converted, to produce the stator rotating magnetic field. BLDC motors therefore use the same or similar control algorithms as AC synchronous motors, especially PMSM motors.

Problems arise with known multi-phase permanent magnet rotor motors in that it is typically assumed that all of the phase coils, i.e., the stator coils, are identical having the same values of resistance and inductance. Consequently, the stator coils are typically driven using the same amplitudes of motor control voltages applied with suitable phase differences. Typically, only one stator coil is considered when determining the amplitudes of the motor control voltages. However, the assumption that all of the coils are identical is not always the case as differences in coil parameters such as resistance and inductance may result from imperfect coil manufacturing techniques or differences in parameter values may result from wear or deterioration during prolonged motor operation. For example, during manufacture, different resistances of coils may result from the coil wire being unintentionally stretched during coil winding, or variations in the thickness of the enameled layer over the length of the coil wire, or variations in the lead-out lengths between coils. Other problems may arise due to asymmetries in the laminations of the stators. The result of such differences may be imbalances in operating or physical parameters between the coils especially when being driven. This may lead to one or more disadvantages including a loss of efficiency in the operation of the motor.

Among other things, what is therefore desired is an improved method of adjusting and/or balancing motor control voltages for a permanent magnet rotor motor to reduce or eliminate imbalances in torque between the stator coils.

OBJECTS OF THE INVENTION

An object of the invention is to mitigate or obviate to some degree one or more problems associated with known methods of controlling a three-phase permanent magnet rotor motor.

The above object is met by the combination of features of the main claims; the sub-claims disclose further advantageous embodiments of the invention.

Another object of the invention is to provide an improved method of adjusting motor control voltages for a permanent magnet rotor motor to reduce or eliminate imbalances in torque between the stator coils.

A further object of the invention is to provide an improved method of balancing motor control voltages for a permanent magnet rotor motor.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method of adjusting motor control voltages for a permanent magnet rotor motor comprising three phase coils, each phase coil having two free ends, the three phase coils being without a common node. The method comprises driving the motor by applying motor control voltages in turn to respective pairs of the three phase coils with a remaining one of the three phase coils not being driven. Then, determining for each of the pairs of the three phase coils respective values of a motor operating parameter. The values of the motor operating parameter are compared, and based on the comparison, three-phase stationary reference frame motor control voltages $v_a$, $v_b$, $v_c$ are adjusted to provide adjusted three-phase stationary reference frame motor control voltages $v'_a$, $v'_b$, $v'_c$.

Preferably, the three-phase stationary reference frame motor control voltages $v_a$, $v_b$, $v_c$ to be adjusted are generated for driving the three phase coils in a field-oriented control (FOC) mode of operation of the motor and the method comprises, based on the comparison of the values of the motor operating parameter, adjusting said three-phase stationary reference frame motor control voltages $v_a$, $v_b$, $v_c$ generated for driving the three phase coils in an FOC mode of operation to provide adjusted three-phase stationary reference frame motor control voltages $v'_a$, $v'_b$, $v'_c$ for driving the three phase coils in the FOC mode of operation.

In a second main aspect, the invention provides a three-phase permanent magnet rotor motor comprising three phase coil windings, each phase coil winding having two free ends, the three phase coil windings being without a common node; and a controller, said controller being configured to implement the method of the first main aspect of the invention.

In a third main aspect, the invention provides a controller for a three-phase permanent magnet rotor motor comprising three phase coil windings, each phase coil winding having two free ends, the three phase coil windings being without a common node, the controller being configured to implement the method of the first main aspect of the invention.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the Figs. may be implemented in various forms of hardware, software, or combinations thereof. These elements may be implemented in a combination of hardware and software on one or more appropriately programmed general-purpose devices, which may include a processor, a memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In the following description, references to any of "coil", "winding", "coil winding", "phase coil", "phase coil winding", "stator coil", and "stator winding" will be taken to mean one and the same thing, e.g., "stator coil".

Figure 1:
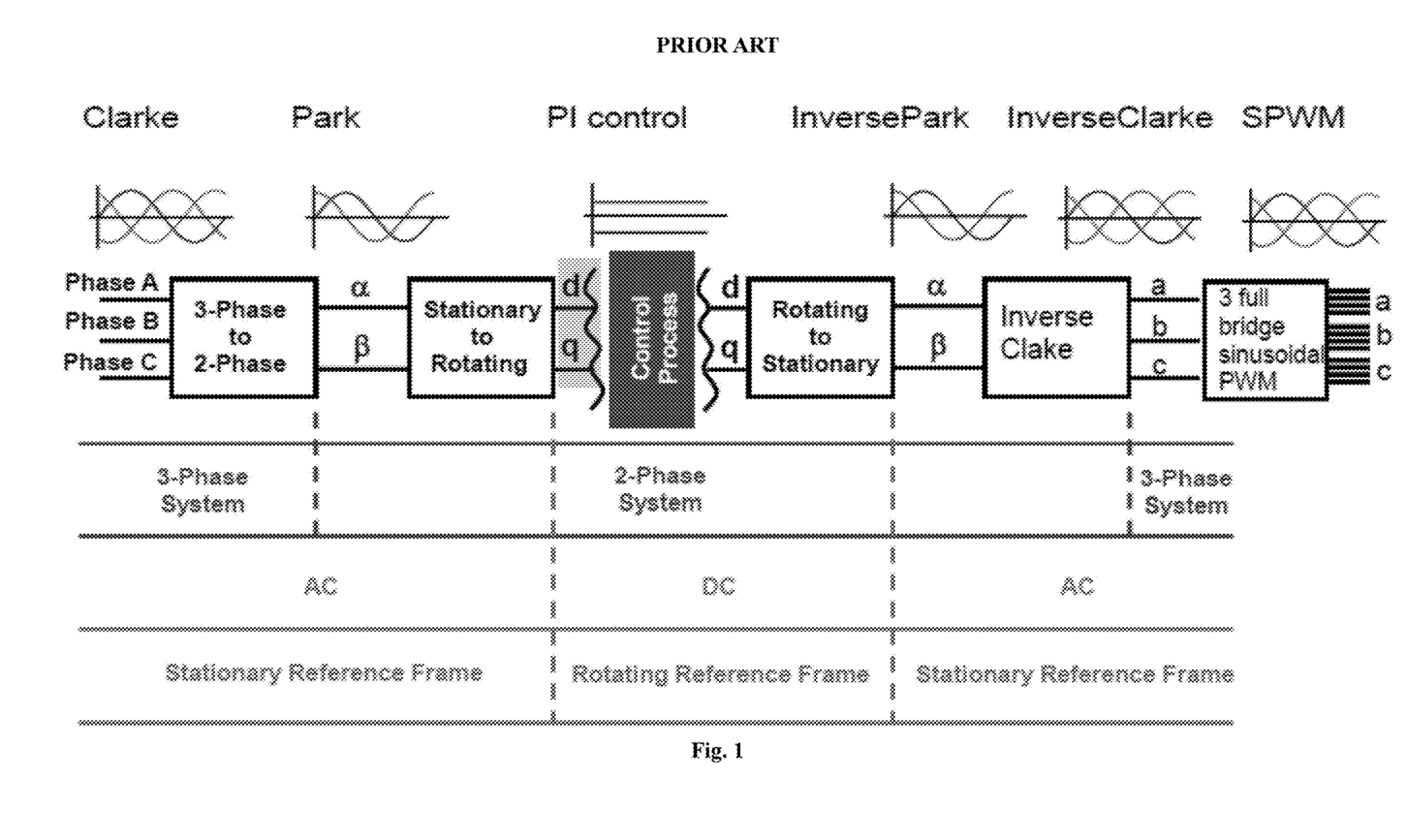
FIG. 1 is a block schematic diagram of a known sensorless FOC system to drive separated phase coil windings of a three-phase, six-wire permanent magnet rotor motor.

FIG. 1 comprises a schematic block diagram taken from the publication entitled "Sensorless PMSM Field-Oriented Control", the content of which is incorporated herein by reference. FIG. 1 comprises a schematic block diagram illustrating the known concept of sensorless FOC of three-phase separated coils (stator coils) with full-bridge inverters to drive the separated phase coils of a permanent magnet rotor motor such as a PMSM motor. In FIG. 1, the motor comprises three phases but with three separated, i.e., independent, phase coils and three full-bridge inverters to drive the separated phase coils.

Figure 2:
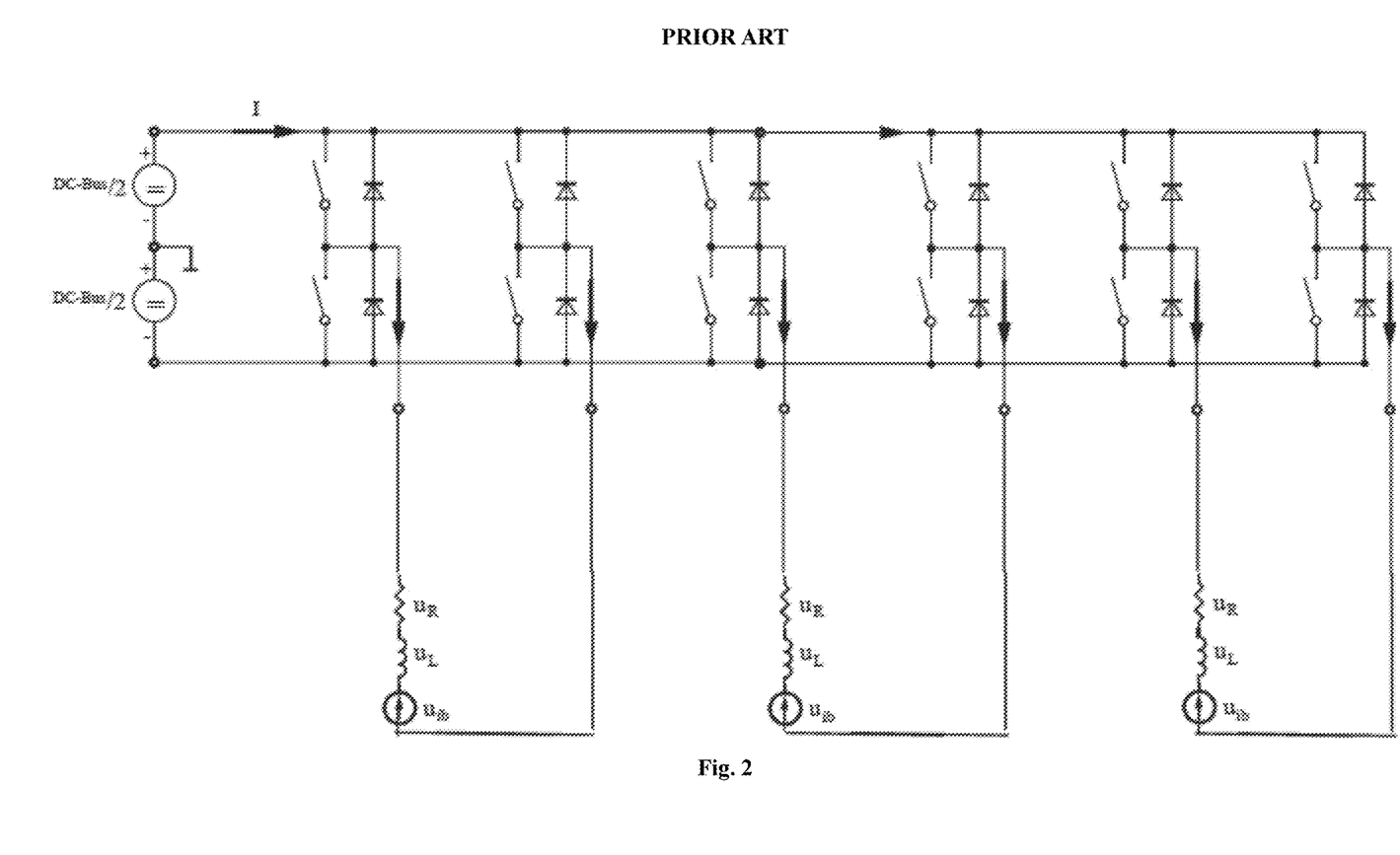
FIG. 2 is a block schematic diagram of a full-bridge inverter circuit for the known FOC system of FIG. 1.

FIG. 2 comprises a schematic diagram from the same publication of the three full-bridge inverters used to drive the three-phase separated coils. After the inverse-Clark transform (FIG. 1), the sinusoidal three phase voltages are mapped into switching on times for each of the three full-bridge inverters to give the positive and negative voltages to drive the separated phase coils.

Figure 3:
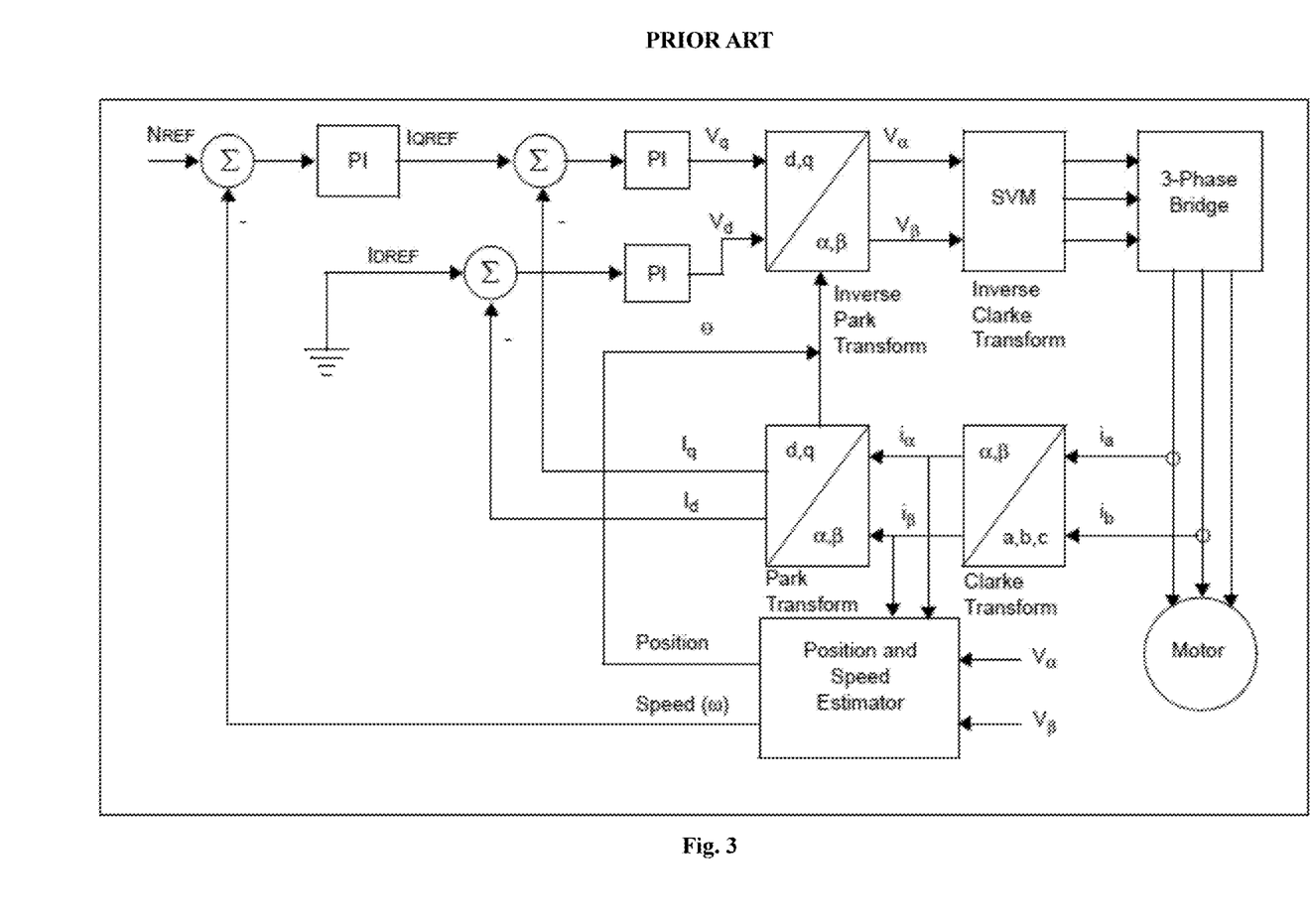
FIG. 3 is a detailed schematic block diagram of the known FOC system of FIG. 1.

FIG. 3 comprises a known vector control block diagram comprising a controller suitable for controlling the three-phase separated phase coils associated with FIGS. 1 and 2. This vector control block diagram is described in the publication entitled "Sensorless Field Oriented Control of PMSM Motors" authored by Jorge Zambada, published by Microchip Technology Inc. in 2007 as paper AN1078, the content of which is also incorporated herein by way of reference.

Vector control of a synchronous motor can be summarized as follows:

(i) The 3-phase stator currents are measured. These measurements typically provide values for only $i_a$ and $i_b$. $i_c$ can be calculated because $i_a$, $i_b$ and $i_c$ have the following relationship:

$i_a + i_b + i_c = 0$.

(ii) The 3-phase currents are converted to a two-axis stationary reference frame system. This conversion provides the variables $i_\alpha$ and $i_\beta$ from the measured $i_a$ and $i_b$ and the calculated $i_c$ values. $i_\alpha$ and $i_\beta$ are time-varying quadrature current values as viewed from the perspective of the stator, i.e., a two-dimensional stationary orthogonal reference frame or coordinate system.

(iii) The two-axis coordinate system is rotated to align with the rotor flux using a transformation angle θ calculated at the last iteration of the control loop. This conversion provides the $I_d$ and $I_q$ variables from $i_\alpha$ and $i_\beta$. $I_d$ and $I_q$ are the quadrature currents transformed to the two-axis rotating (reference frame) coordinate system, a two-axis or two-dimensional rotating orthogonal reference frame or coordinate system. For steady state motor operating conditions, $I_d$ and $I_q$ are constant.

(iv) Error signals are formed using $I_d$, $I_q$ and reference values for each.

The $I_d$ reference controls rotor magnetizing flux.

The $I_q$ reference controls the torque output of the motor.

The error signals are input to PI controllers.

The output of the controllers provide $V_d$ and $V_q$, which is a voltage vector that will be sent to the motor.

(v) A new transformation angle θ is estimated where $v_\alpha$, $v_\beta$, $i_\alpha$ and $i_\beta$ are the inputs. The new angle guides the FOC algorithm as to where to place the next voltage vector.

(vi) The $V_d$ and $V_q$ output values from the PI controllers are rotated back to the two-axis stationary reference frame using the new value of angle θ. This calculation provides the next quadrature voltage values $v_\alpha$ and $v_\beta$.

(vii) The $v_\alpha$ and $v_\beta$ values are transformed back to 3-phase values $v_a$, $v_b$ and $v_c$. The 3-phase voltage values are used to calculate new PWM duty cycle values that generate the desired voltage vector. The entire process of transforming, PI iteration, transforming back and generating PWM is schematically illustrated in FIGS. 1 and 3.

Figure 4:
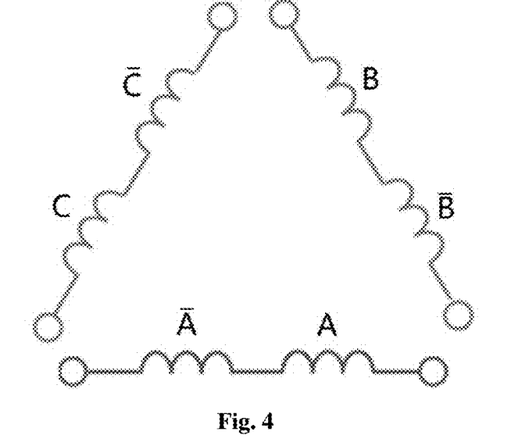
FIG. 4 is a schematic diagram showing a six-wire configuration of three-phase coil windings of a three-phase separated windings motor in which the motor operating method in accordance with the invention can be implemented.
Figure 5:
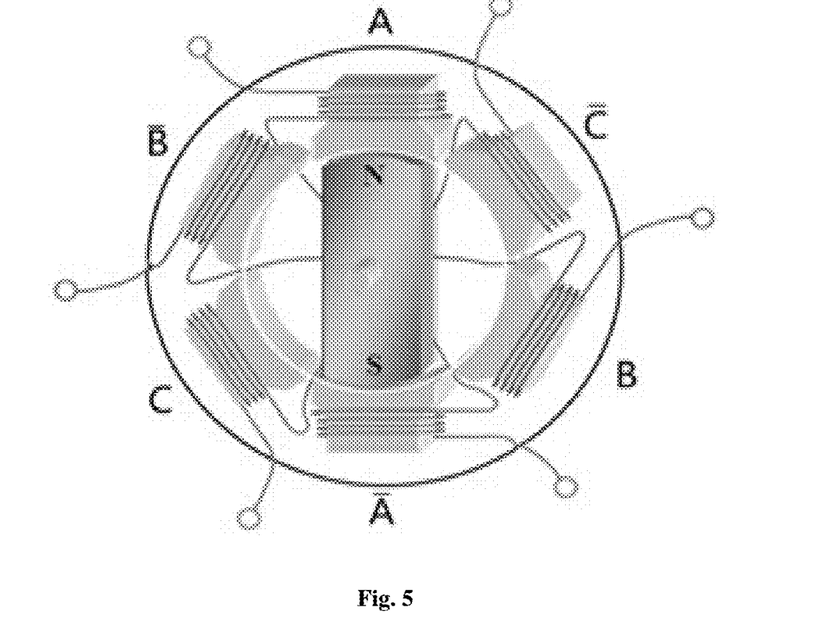
FIG. 5 is a physical diagram showing the six-wire configuration of the three phase coil windings of the three-phase separated windings motor of FIG. 4.

FIG. 4 provides a schematic diagram showing a six-wire configuration of the phase coil windings of a three-phase motor in accordance with the invention whilst FIG. 5 provides a physical diagram showing the six-wire configuration of the phase coil windings of the three-phase motor of FIG. 5. Although the rotor in FIG. 5 is shown as a single rotating magnet, it will be understood that the rotor comprises a plurality of radially spaced permanent magnets in a conventional manner for a synchronous motor.

Figure 6:
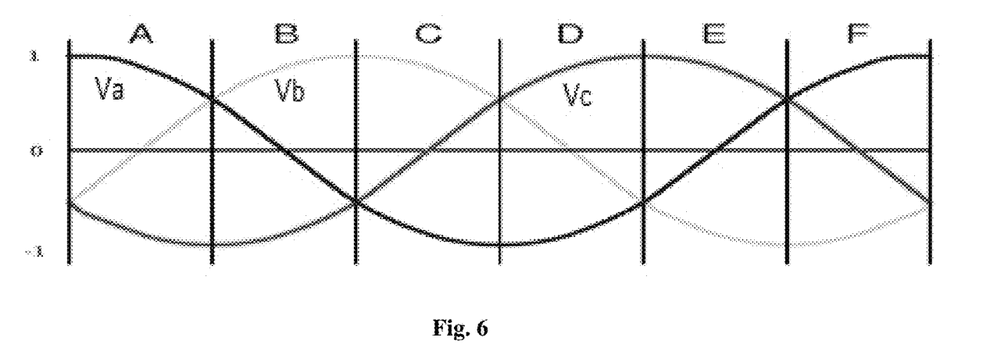
FIG. 6 shows the normal sinewave control waveforms for the three-phase, six-wire separated windings motor of FIG. 4 when operating in a field-oriented-control (FOC) mode of motor operation.

FIG. 6 shows the normal sinewave control waveforms (three-phase stationary reference frame motor control voltages) for the three-phase, six-wire separated windings motor of FIG. 4 when operating in an FOC mode of motor operation.

Figure 7:
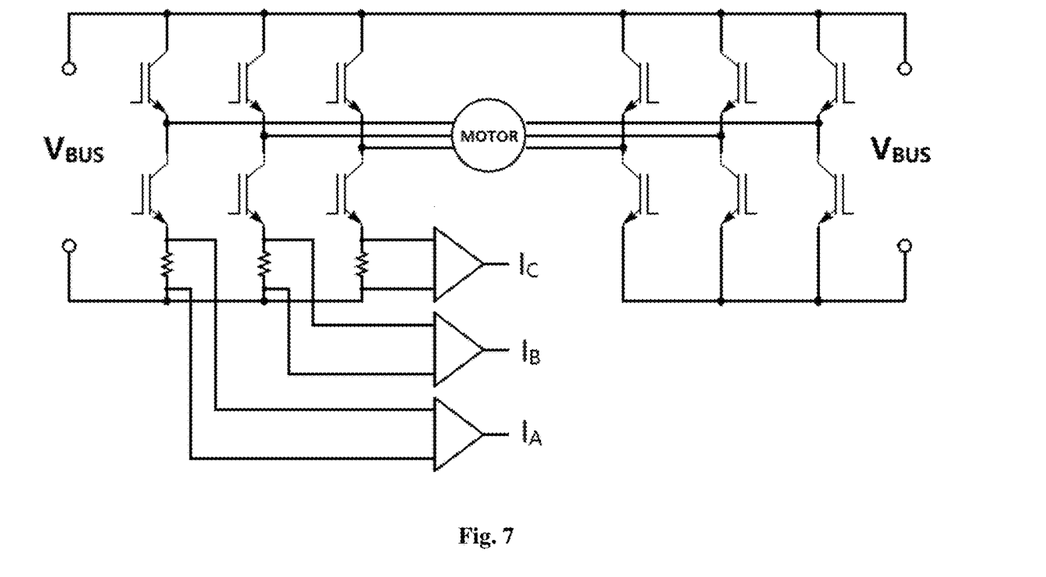
FIG. 7 is a schematic block diagram of an embodiment of a full-bridge inverter circuit for a motor control system in accordance with the invention for the three-phase, six-wire separated windings motor of FIG. 4.

FIG. 7 provides a schematic block diagram of one embodiment of a full-bridge inverter circuit for a controller for said motor. The six-wire phase coil winding configuration results from the fact that none of the three phase coil windings having any common connection points in contrast to the conventional delta or star stator winding configurations which have at least one common connection point between at least two of the phase coil windings.

Figure 8:
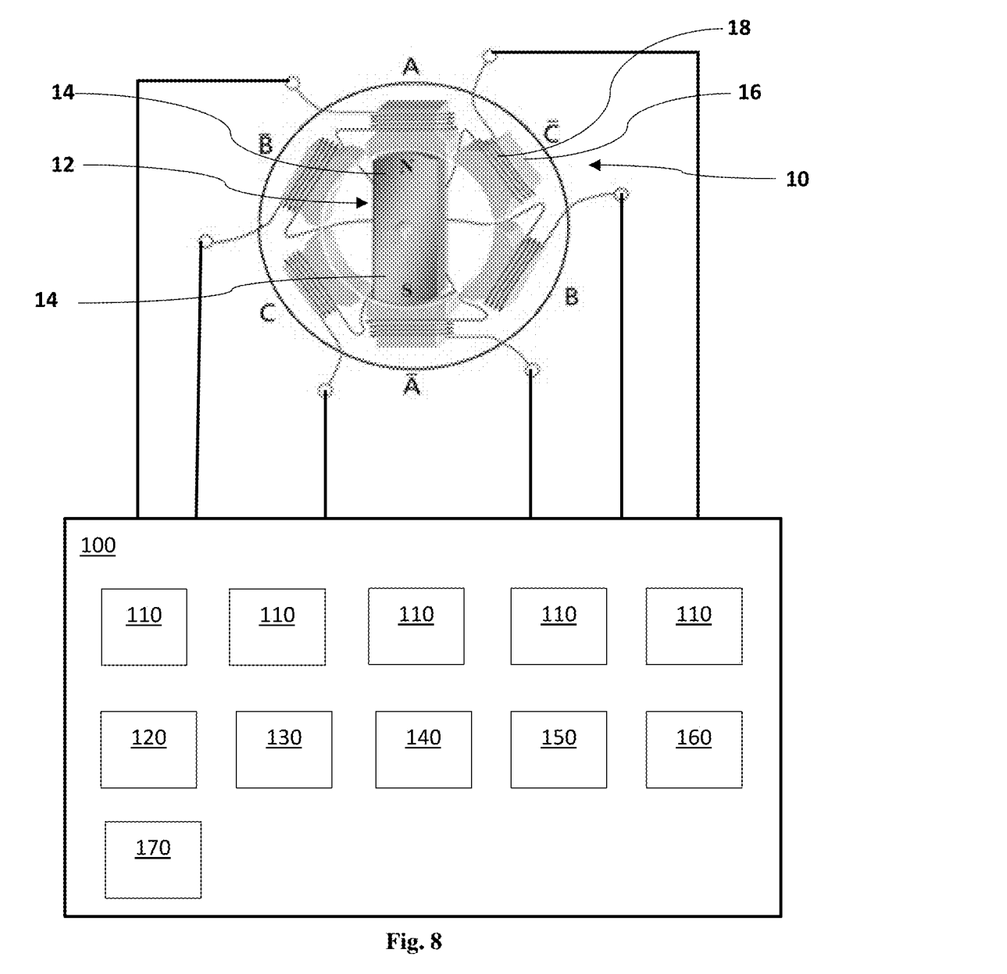
FIG. 8 is a schematic diagram a three-phase separated windings motor in which the motor operating method in accordance with the invention can be implemented.

FIG. 8 shows an exemplary embodiment of an improved motor controller 100 for a three-phase separated windings motor 10 in accordance with concepts of the present invention. The three-phase separated windings motor 10 has a permanent magnet rotor 12 with a plurality of permanent magnets 14 and a stator 16 with a plurality of phase coil (stator) windings 18. Although the rotor 12 in FIG. 8 is shown as a single rotating magnet, it will be understood that the rotor 12 comprises a plurality of radially spaced permanent magnets 14 in a conventional manner for a synchronous motor. Whilst the three-phase separated windings motor 10 is shown with the stator 16 surrounding the rotor 12 in a known manner, it will be understood that the concepts of the present invention are equally applicable to a synchronous motor where the rotor 12 surrounds the stator 16, i.e., the stator 16 is arranged internally of the rotor 12.

In the illustrated embodiment, the motor controller 100 may comprise a plurality of functional blocks 110 for performing various functions thereof. For example, the motor controller 100 may comprise a suitably modified or suitably configured known vector-based closed-loop controller such as a direct torque control (DTC) closed-loop controller or an FOC closed-loop controller as described, for example, in "Sensorless Field Oriented Control of PMSM Motors" of paper AN1078 and as illustrated in FIG. 9 herein but modified as described below in accordance with the concepts of the invention.

The motor controller 100 may, for example, be implemented using logic circuits and/or executable code/machine readable instructions stored in a memory for execution by a processor 120 to thereby perform functions as described herein. For example, the executable code/machine readable instructions may be stored in one or more memories 130 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 130 may comprise processor-readable memories for use with respect to one or more processors 120 operable to execute code segments of the motor controller 100 and/or utilize data provided thereby to perform functions of the motor controller 100 as described herein. Additionally, or alternatively, the motor controller 100 may comprise one or more special purpose processors (e.g., application specific integrated circuit (ASIC), field programmable gate array (FPGA), graphics processing unit (GPU), and/or the like configured to perform functions of the motor controller 100 as described herein.

Figure 9:
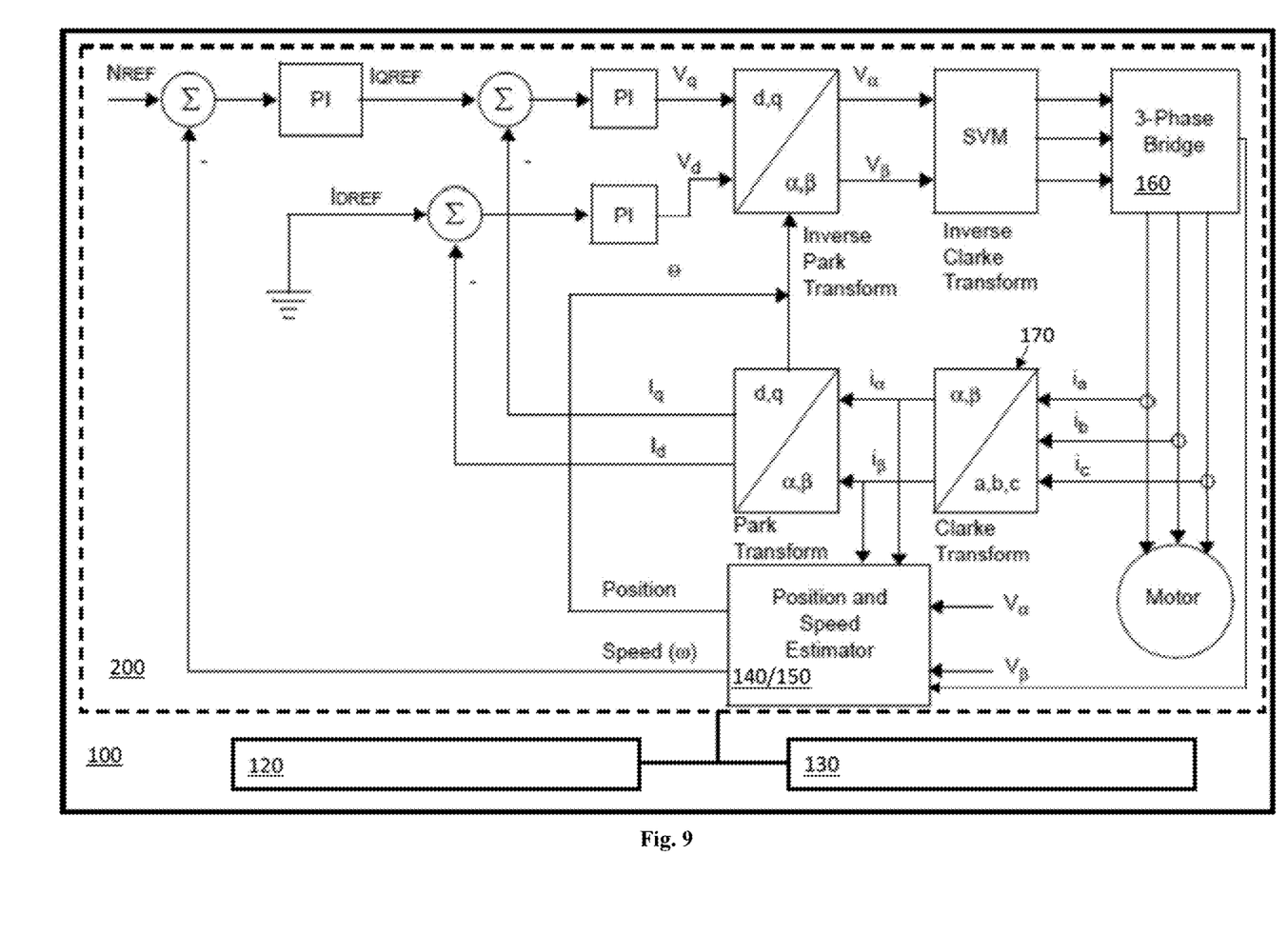
FIG. 9 is a detailed schematic block diagram of a motor control system in accordance with the invention.

In a broad aspect, the invention comprises using the motor controller 100 of FIGS. 8 and 9, e.g., using the modified FOC controller 200 of FIG. 9, to implement the motor operating procedure in accordance with the invention. The motor controller 100 may comprise any known, suitable closed-loop controller for synchronous operation and may comprise the FOC controller 200 as described in "Sensorless Field Oriented Control of PMSM Motors" of paper AN1078 or as described in the publication entitled "Sensorless PMSM Field-Oriented Control", the FOC controller 200 being suitably modified or reconfigured to implement the motor operating method of the invention. Two or more of the outputs of the 3-phase bridge module 160 of the motor controller 100/200 of FIG. 13 comprising two or more of the sensed currents denoted as "$I_A$", "$I_B$" and "$I_C$" in FIG. 11 may be fed to the Clarke Transform module 170 of the motor controller 100/200 for processing. A further modification of the motor controller 200 compared to the conventional controller of FIG. 3 is that, in the motor controller of FIG. 8, preferably all of the 3-phase stator currents $i_a$, $i_b$, $i_c$ ("$I_A$", "$I_B$" and "$I_C$") are measured. This improves the efficiency of control of the motor 10.

The modified or reconfigured motor controller 100/200 of FIGS. 8 and 9 is arranged to operate the synchronous motor 10 having a permanent magnet rotor 12 and stator windings 18 by energizing the stator windings 18 using pulse width modulated (PWM) motor control signals.

Taking the six-wire, three phase motor winding configuration of FIG. 8 controlled by the modified FOC controller 200 of FIG. 9, the method of operating the synchronous motor 10 in accordance with the invention comprises driving the motor 10 by applying motor control voltages in turn to respective pairs of the three phase coils A, B, C with a remaining one of the three phase coils in each case not being driven. A first respective pair of the three phase coils A, B, C may comprise coils B and C, a second respective pair of the three phase coils A, B, C may comprise coils A and C, and a third respective pair of the three phase coils A, B, C may comprise coils A and B. For example, in the case of the first respective pair of the three phase coils A, B, C comprising coils B and C, coil A is not driven, i.e., $v_a$=0, but coils B and C are each driven, i.e., $v_b$, $v_c$ each are controlled to have values as will be hereinafter described. The method includes then determining or measuring for each of the pairs of the three phase coils respective values of a motor operating parameter. The motor operating parameter preferably comprises a rotation period of the rotor 12 for each respective pair of the three phase coils A, B, C, but other operating parameters of the motor 10 such as back-emf may be utilized instead. The method further comprises comparing the determined values of the motor operating parameter and, based on said comparison, adjusting the three-phase stationary reference frame motor control voltages $v_a$, $v_b$, $v_c$ to provide adjusted three-phase stationary reference frame motor control voltages $v'_a$, $v'_b$, $v'_c$.

Preferably, the three-phase stationary reference frame motor control voltages $v_a$, $v_b$, $v_c$ to be adjusted are generated for driving the three phase coils in the FOC mode of operation of the motor and the method comprises, based on the comparison of the values of the motor operating parameter, adjusting said three-phase stationary reference frame motor control voltages $v_a$, $v_b$, $v_c$ to provide adjusted three-phase stationary reference frame motor control voltages $v'_a$, $v'_b$, $v'_c$ for driving the three phase coils in said FOC mode of operation. This has the advantage of at least reducing or even eliminating imbalances of torque between the phase coils A, B, C when driven in the FOC mode of operation.

The method preferably comprises iteratively repeating the foregoing steps until it is determined that the values of the motor operating parameter for each of the pairs of the three phase coils result in the values of the motor operating parameter becoming equal or the values of the motor operating parameter falling within predetermined thresholds or a predetermined threshold range.

Preferably also, the method of operating the motor 10 by adjusting the motor control voltages is a one-off method implemented after each initiation of a start-up method of the motor 10 and once the rotor 12 has achieved a steady or constant speed of rotation and/or has reached a sufficient speed of rotor rotation to enable a position and speed estimation module 140/150 of the motor controller 100/200 to generate a first or new estimated rotor angle θ.

Preferably, after initiation of each start-up operation of the motor 10, the method comprises using a first or new estimated rotor angle θ to derive corresponding two-axis stationary reference frame voltages $v_\alpha$, $v_\beta$; and, based on the two-axis stationary reference frame voltages $v_\alpha$, $v_\beta$, generating three sets of three-phase stationary reference frame voltage waveforms Vbc, Vac, Vab for driving respective pairs of the three phase coils to then determine or measure the respective values of the motor operating parameter for each of the pairs of the three phase coils.

Figure 10A:
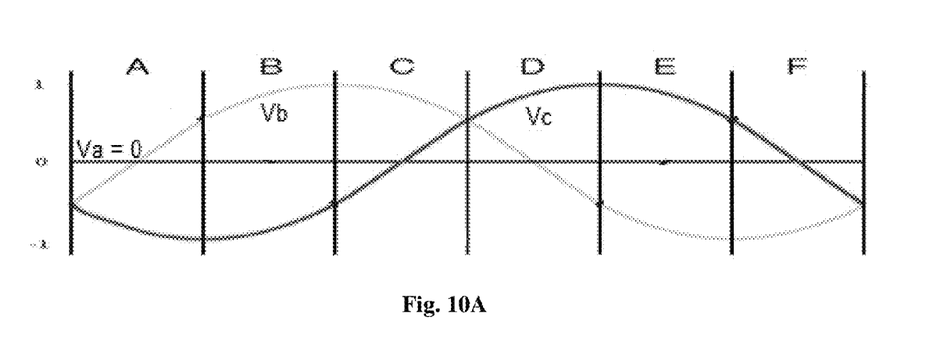
FIG. 10A shows the Vbc three-phase stationary reference frame voltage waveform for driving a respective pair of the three phase coils in accordance with the motor operating method of the invention.
Figure 10B:
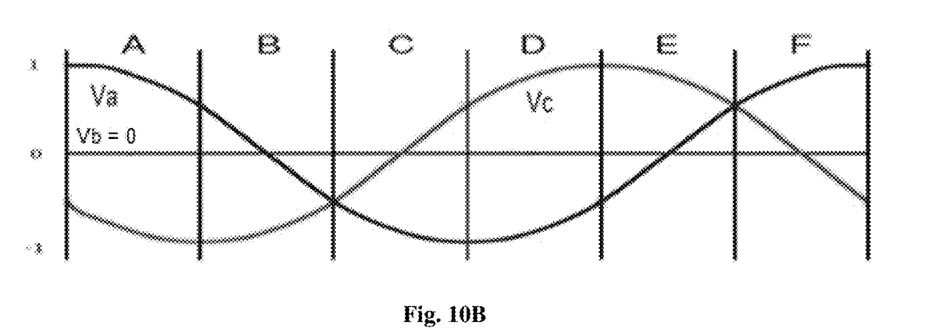
FIG. 10B shows the Vac three-phase stationary reference frame voltage waveform for driving another respective pair of the three phase coils in accordance with the motor operating method of the invention.
Figure 10C:
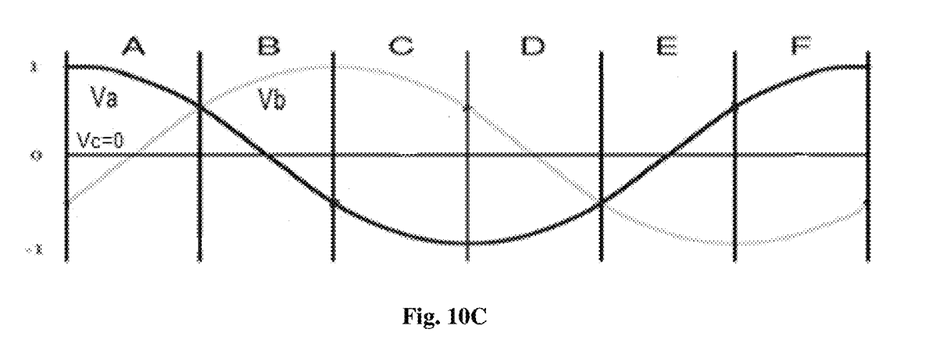
FIG. 10C shows the Vab three-phase stationary reference frame voltage waveform for driving another respective pair of the three phase coils in accordance with the motor operating method of the invention.

In one embodiment, the sets of the three-phase stationary reference frame voltage waveforms Vbc, Vac, Vab for driving respective pairs of the three phase coils are shown in FIGS. 10A, 10B and 10C respectively, where:

for FIG. 10A, Vbc: $v_a$=0

$v_b = -\sqrt{3}v_\alpha + v_\beta$ $v_c = -\sqrt{3}v_\alpha + v_\beta$;

for FIG. 10B, Vac: $\sqrt{3}v_\alpha + v_\beta$ $v_b = 0$ $v_c = -2v_\beta$; and for FIG. 10C, Vab: $v_a = \sqrt{3}v_\alpha + v_\beta$ $v_b = 2v_\beta$ $v_c = 0$.

The step of driving the motor 12 by applying motor control voltages in turn to respective pairs of the three phase coils comprises applying in turn each set of the three-phase stationary reference frame voltage waveforms Vbc, Vac, Vab as the motor control voltages for the motor where the remaining one of the three coils A, B, C respectively associated with each of the pairs (BC; AC; AB) is not driven, i.e., one of $v_a$, $v_b$, or $v_c$=0.

The step of determining for each of the respective pairs of the three phase coils A, B, C values of the motor operating parameter comprises determining or measuring for each of said set of applied three-phase stationary reference frame voltage waveforms Vbc, Vac, Vab respective periods of the rotation $t_{bc}$, $t_{ac}$, $t_{ab}$ of the rotor 12. The determined or measured values of the periods of rotation $t_{bc}$, $t_{ac}$, $t_{ab}$ of the rotor 12 are then compared.

Preferably, the motor control voltages applied in turn to respective pairs of the three phase coils are derived from two-axis rotating reference frame control voltages $V_d$, $V_q$. Preferably, also, the method includes, prior to the step of determining the two-axis stationary reference frame voltages $v_\alpha$, $v_\beta$, setting the two-axis rotating reference frame control voltages $V_d$, $V_q$ to respective fixed predetermined values. In one embodiment, $V_q$ is set to a value of 0.5, whilst $V_d$ is set to a value of 0. It will be understood that different fixed predetermined values of $V_d$, $V_q$ could be used in other embodiments. It is noted here that the values of the two-axis rotating reference frame control voltages $V_d$, $V_q$ are not obtained from the motor controller 100/200 PI module in contrast to a conventional synchronous motor FOC mode of operation. In effect the mode of operating the motor 10 in accordance with the invention can be considered as comprising a $V_q$ control phase intermittent the motor start-up phase and the motor FOC operating phase. The motor start-up phase will typically comprise an open-loop start-up phase but could comprise a closed-loop start-up phase.

Once the respective fixed predetermined values for $V_d$, $V_q$ have been set and implemented, the method preferably comprises obtaining from the position and speed estimator module 140/150 of the controller 100/200 a first or new estimated rotor angle θ. Then, based on the estimated rotor angle θ and the two-axis rotating reference frame control voltages $V_d$, $V_q$, the two-axis stationary reference frame voltages $v_\alpha$, $v_\beta$ may be derived using inverse Park transform of the two-axis rotating reference frame control voltages $V_d$, $V_q$.

The following description of a specific example of operation of the motor 10 in accordance with the invention provides further insight into the principles of the method.

In this specific example, it is assumed that, for the three stator coils A, B, C, the stator coil C resistance ($R_c$) is larger than the resistances of the stator coils A, B ($R_{a,b}$) and that the resistances of the stator coils A, B are equal, i.e., $R_c > R_a = R_b$. It is also assumed that the inductances ($L_{a,b,c}$) of the three stator coils A, B, C are the same, i.e., $L_a = L_b = L_c = L$.

According to the PMSM Electric Model, the following set of equations apply:

$$v_a = R_a i_a + L\frac{di_a}{dt} + e_a;$$

$$v_b = R_b i_b + L\frac{di_b}{dt} + e_b;\ \text{and}$$

$$v_c = R_c i_c + L\frac{di_c}{dt} + e_c.$$

If it is assumed that the rotor 12 is rotating at a constant speed or near constant speed, then the amplitude of the back-emf ($e_{a,b,c}$) should be same for all three stator coils A, B, C, i.e., $e_a = e_b = e_c$ assuming that all three stator coils A, B, C have the same characteristics/parameters. In such a case, in a conventional FOC mode of operating the motor 10, the three stator coils A, B, C would be driven with the same amplitude sine waves, i.e., $v_a = v_b = v_c$. However, taking into account the above assumptions for the specific example of operating the motor 10 in accordance with the invention, then as $R_c > R_a = R_b$, it can de determined that $i_c < i_a$, $i_b$ and $i_a = i_b$. Since the torque ($T_{a,b,c}$) produced by each stator coil 18 is directly proportional to its stator current ($i_{a,b,c}$), i.e., $T_{a,b,c} = k\ i_{a,b,c}$ where k is constant, it can be determined that $T_c < T_a, T_b$ and $T_a = T_b$. This results in an imbalance between the torque ($T_{a,b,c}$) produced by each stator coil 18 which is undesirable as it will affect the performance/efficiency of the motor 10. To reduce or eliminate this problem, it is desirable to improve the performance/efficiency of the motor 10 by increasing $v_c$, i.e., making $v_c > v_a = v_b$ so as to compensate the effect of $R_c > R_a = R_b$ such that $T_c \approx T_a \approx T_b$ again.

It will be understood that the assumptions made for the specific example of operating the motor 10 in accordance with the invention will not hold true for every scenario and that suitable modifications to the foregoing will be required. However, the specific example serves to illustrate one embodiment of the implementation of the method of operating the motor 10 in accordance with the invention.

The imbalance in torque ($T_a \ne T_b \ne T_c$) may result from, for example, differences in any one or more of stator resistance, stator inductance, motor controller MOSFET resistance, motor controller PCB trace resistance, etc. Therefore, in the method according to the invention, a "VQ Control" mode is inserted between the conventional "Start-Up" mode and "FOC Torque" mode in order to identify any imbalance in torque between the stator coils 18.

In the "VQ Control" mode, the motor 10 is successively driven in turn by each set of the three-phase stationary reference frame voltage waveforms Vbc, Vac, Vab (FIGS. 10A to 10C). Since, in each case, one of the stator voltages ($v_{a,b,c}$) is set to zero, it is possible to determine any torque imbalance between the three phases of the motor 10 by comparing the periods of rotation ($t_{bc,ac,ab}$) of the rotor 12 for each each set of the three-phase stationary reference frame voltage waveforms Vbc, Vac, Vab.

In the "VQ Control" mode, the values of Vq and Vd are set at predetermined values, for example, Vq=0.5 and Vd=0 instead of obtaining values for Vq, Vd from the PI control module of the motor controller 100/200 as would be the case in conventional FOC operation of the motor 10. The rotor angle θ is estimated by the position and speed estimator module 140/150 of the motor controller 100/200. The two-axis stationary reference frame voltages $v_\alpha$, $v_\beta$, are then calculated by an Inverse Park transform based on the estimated rotor angle θ and the values of Vq and Vd. Then, the three-phase stationary reference frame motor control voltages $v_a$, $v_b$, $v_c$ are calculated based, in turn, on each set of the three-phase stationary reference frame voltage waveforms Vbc, Vac, Vab rather than deriving these by Inverse Clarke transform as in conventional FOC operation of the motor 10. Finally, the respective periods of rotation $t_{bc}$, $t_{ac}$, and $t_{ab}$ of the stator 16 are measured.

Case 1 (Balanced Case)

Where all three stator coils 18 are identical, i.e., have identical characteristics/parameters, the value of torque ($T_{a,b,c}$) produced by each stator coil 18 would be the same, i.e., $T_a = T_b = T_c$. Hence the measured periods of rotation ($t_{bc,ac,aa}$) would be the same, i.e., $t_{bc}=t_{ac}=t_{ab}$. Consequently, where the method of the invention is applied and the measured periods of rotation ($t_{bc,ac,ab}$) are found to be the same, it can be concluded that the stator coils 18 are in balance and that no imbalance has occurred due to manufacturing differences or through unequal wear during motor operation.

It will be appreciated that the method of the invention can not only be applied as a method of adjusting or balancing the respective torques produced by the stator coils 18 but could be used to test motors 10 to determine if any imbalance between the stator coils 18 exist whether by manufacturing issues or wear occurring during motor operation.

Case 2 (Unbalanced Case)

Taking again the assumptions that the stator coil C resistance ($R_c$) is larger than the resistances ($R_{a,b}$) of the stator coils A, B such that $R_c > R_a = R_b$ and that other coil parameters such as stator inductance, etc., are the same, the torque generated from stator coil C will be smaller than the torques generated from stator coils A and B such that $T_c < T_a, T_b$ and $T_a = T_b$.

When applying the set of the three-phase stationary reference frame voltage waveforms Vab and by comparing the respective measured periods of rotation $t_{bc}$, $t_{ac}$ and $t_{ab}$, due to $T_c < T_a, T_b$ and $T_a = T_b$, it will be observed that, in this example, $t_{ab} < t_{bc}, t_{ac}$ as larger torques $T_a$ and $T_b$ are observed from stator coils A and B because $v_c = 0$ in Vab. Larger torques imply faster rotor rotation speeds and hence a smaller rotor rotation period $t_{ab}$ results when Vab is applied.

Apply adjusted stator coil voltages ($v'_{a,b,c}$) as follows:

$$v'_a = v_a$$

$$v'_b = k_b v_b$$

$$v'_c = k_c v_c$$

To balance the torque discrepancy, keep $v'_b = v_b$ by setting $k_b = 1$ and increase $v'_c$ by setting $k_c = (1+A)$ such that $t_{ab} \approx t_{bc} \approx t_{ac}$.

After "Start-Up" mode, the rotor 12 shall be in steady rotation and the position and speed estimation module 140/150 shall be ready with a correct estimated angle θ for the "VQ Control" Mode.

In one embodiment, the method therefore comprises:

In Step 1, start "VQ Control" mode by initializing Vq with a certain value, for example, Vq=0.5, and setting Vd=0 and furthermore making $k_b = k_c = 1$. Then, apply the inverse Park transform to obtain the two-axis stationary reference frame voltages $v_\alpha$, $v_\beta$, for generation of the sets of three-phase stationary reference frame voltage waveforms Vbc, Vac, Vab using the relationships:

for *Vbc:* $v_a = 0$ $$v_b = -\sqrt{3}v_\alpha + v_\beta$$

$$v_c = -\sqrt{3}v_\alpha + v_\beta;$$

for *Vac:* $\sqrt{3}v_\alpha + v_\beta$ $$v_b = 0$$

$$v_c = -2v_\beta; \text{ and}$$

for *Vab:* $v_a = \sqrt{3}v_\alpha + v_\beta$ $$v_b = 2v_\beta$$

$$v_c = 0.$$

In Step 2, drive the motor 10 by applying in succession the three waveforms Vbc, Vac, Vab one by one with the stator coil voltage ($v'_{a,b,c}$) as follows:

$$v'_a = v_a$$

$$v'_b = k_b v_b$$

$$v'_c = k_c v_c$$

and then measure the respective periods of rotor rotation ($t_{bc,ac,ab}$) for the three waveforms Vbc, Vac, Vab.

In Step 3, calculate:

$$\Delta t_b = t_{bc} - t_{ac}$$

$$\Delta t_c = t_{bc} - t_{ab}.$$

In Steps 4 and 5, set a predetermined or selected threshold to determine whether the motor 10 is in balance or not. In a case where $-\text{Threshold} \leq \Delta t_{b,c} \leq \text{Threshold}$, the motor 10 is determined to be in balance, otherwise the motor 10 is determined to be imbalanced. When it is determined that the motor 10 is imbalanced, $k_b$ and $k_c$ are adjusted by adding or subtracting Δ, (e.g., Δ=0.01) to compensate for the imbalance of the motor 10 according to:

if $\Delta t_{b,c} > \text{Threshold}, k_{b,c} = k_{c} + \Delta \leq \text{Upper limit},$ else if $\Delta t_{b,c} < -\text{Threshold}, k_{b,c} = k_{b,c} - \Delta \geq \text{Lower limit}.$ The value of $k_b$ and $k_c$ will be bounded by predetermined upper and lower limits, e.g., $0.8 \leq k_{b,c} \leq 1.2$.

Steps 2 to 5 are repeated until the motor 10 is considered to be in balance.

The three waveforms Vbc, Vac, Vab can be used to drive the motor 10 even if one of the stator coils 18 is found to be non-functioning at the expense of lower efficiency and lower maximum motor torque. In other word, even where one phase of the motor 10 fails, the three waveforms Vbc, Vac, Vab can be used to drive the motor 10 rather than stopping the motor as would be the conventional response when one of the motor phases fails.

The invention also provides a three-phase permanent magnet rotor motor 10 having a controller 100/200 configured to implement the method according to the invention.

The motor controller 100/200 may comprise a plurality of full-bridge inverters, wherein each full-bridge inverter has two output ends electrically connected to the two free ends of a corresponding phase coil, the controller being configured to operate the plurality of full-bridge inverters to output pulse modulated control signals to their respective phase coils. Preferably, each full-bridge inverter has a current sense circuit connected to only one half of each said full-bridge inverter. Preferably also, each of the current sense circuits respectively connected to only one half of their said full-bridge inverter is connected to the position and speed estimation module 140/150 of the controller 100/200. Preferably, the current sense circuits are connected to a same respective half-side of their said full-bridge inverter.

In the foregoing description, it is assumed that the method of the invention is applied to permanent magnet rotor motors in which the motor control voltages comprise sine waves or near sine waves. However, the method of the invention can be implemented in trapezoidal motors without modification of the motor controller 100/200. In a trapezoidal motor, the current through the motor windings is switched off and on in a stepwise manner, resulting in a trapezoidal shape of the current waveform. The difference between a trapezoidal motor and a sinusoidal motor is that, in the trapezoidal motor, the current and voltage waveforms can be considered as being stepwise, less natural equivalents to the smoother sinusoidal waveforms in the sinusoidal motor. As such, the method of the invention can be applied to trapezoidal motors without modification of the method steps, although the motor controller 100/200 can be made from less complex and expensive electronic components.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of adjusting motor control voltages for a permanent magnet rotor motor comprising three phase coils, each phase coil having two free ends, the three phase coils being without a common node; the method comprising the steps of:
   (a) driving the motor by applying motor control voltages in turn to respective pairs of the three phase coils with a remaining one of the three phase coils not being driven;
   (b) determining for each of the pairs of the three phase coils respective values of a motor operating parameter;
   (c) comparing the determined values of the motor operating parameter; and
   based on said comparison, adjusting three-phase stationary reference frame motor control voltages $v_a$, $v_b$, $v_c$ to provide adjusted three-phase stationary reference frame motor control voltages $v'_a$, $v'_b$, $v'_c$;
   wherein the method further comprises iteratively repeating steps of (a) to (c) until it is determined that the values of the motor operating parameter for each of the pairs of the three phase coils result in one of: the values of the motor operating parameter being equal; or the values of the motor operating parameter falling within predetermined thresholds or a predetermined threshold range.

2. The method of claim 1, wherein the three-phase stationary reference frame motor control voltages $v_a$, $v_b$, $v_c$ to be adjusted are generated for driving the three phase coils in a field-oriented control (FOC) mode of operation of the motor and the method comprises, based on the comparison of the values of the motor operating parameter, adjusting said three-phase stationary reference frame motor control voltages $v_a$, $v_b$, $v_c$ to provide adjusted three-phase stationary reference frame motor control voltages $v'_a$, $v'_b$, $v'_c$ for driving the three phase coils in the FOC mode of operation.

3. The method of claim 1, wherein the method of adjusting the motor control voltages is a one-off method implemented after initiation of a start-up method of the motor and once the rotor has achieved a steady or constant speed of rotation and/or has reached a sufficient speed of rotor rotation to enable a position and speed estimation module of a motor controller to generate an estimated rotor angle θ.

4. The method of claim 1, wherein the motor operating parameter comprises a period of rotation of the rotor.

5. The method of claim 1, wherein first steps of the method comprise:
   initiating a start-up operation of the motor;
   using an estimated rotor angle θ to derive corresponding two-axis stationary reference frame voltages $v_\alpha$, $v_\beta$; and,
   based on the two-axis stationary reference frame voltages $v_\alpha$, $v_\beta$, generating three sets of three-phase stationary reference frame voltage waveforms vbc, Vac, Vab for driving respective pairs of the three phase coils;
   wherein the step of driving the motor by applying motor control voltages in turn to respective pairs of the three phase coils comprises applying in turn each set of three-phase stationary reference frame voltage waveforms Vbc, Vac, Vab as the motor control voltages for the motor.

6. The method of claim 5, wherein the step of determining for each of the respective pairs of the three phase coils values of a motor operating parameter comprises determining or measuring for each of said set of applied three-phase stationary reference frame voltage waveforms Vbc, Vac, Vab respective periods of rotation $t_{bc}$, $t_{ac}$, $t_{ab}$ of the rotor.

7. The method of claim 6, wherein the step of comparing the determined or measured values of the motor operating parameter comprises comparing the periods of rotation $t_{bc}$, $t_{ac}$, $t_{ab}$ of the rotor.

8. The method of claim 5, wherein the motor control voltages applied in turn to respective pairs of the three phase coils are derived from two-axis rotating reference frame control voltages $V_d$, $V_q$ and, prior to the step of determining the two-axis stationary reference frame voltages $v_\alpha$, $v_\beta$, the method comprises:
    setting the two-axis rotating reference frame control voltages $V_d$, $V_q$ to respective fixed predetermined values; and
    obtaining from a position and speed estimator module of the controller the estimated rotor angle θ.

9. The method of claim 8, wherein the two-axis stationary reference frame voltages $v_\alpha$, $v_\beta$ are determined by obtaining an inverse Park transform of the two-axis rotating reference frame control voltages $V_d$, $V_q$.

10. The method of claim 5, wherein three-phase stationary reference frame motor control voltages $v_a$, $v_b$, $v_c$ corresponding respectively to the three-phase stationary reference frame voltage waveforms Vbc, Vac, Vab for driving respective pairs of the three phase coils are determined from:

$Vbc$: $v_a = 0$ $v_b = -\sqrt{3}v_\alpha + v_\beta$ $v_c = -\sqrt{3}v_\alpha - v_\beta$;

$Vac$: $v_a = \sqrt{3}v_\alpha - v_\beta$ $v_b = -\sqrt{3}v_\alpha + v_\beta$ $v_c = -2v_\beta - \sqrt{3}v_\alpha - v_\beta$; and $Vab$: $v_a = \sqrt{3}v_\alpha + v_\beta$ $v_b = \sqrt{2}v_\beta - \sqrt{3}v_\alpha + v_\beta$ $v_c = -\sqrt{3}v_\alpha - v_\beta$.

11. A three-phase permanent magnet rotor motor comprising:
    three phase coil windings, each phase coil winding having two free ends, the three phase coil windings being without a common node; and
    a controller, said controller configured to:
        (a) drive the motor by applying motor control voltages in turn to respective pairs of the three phase coils with a remaining one of the three phase coils not being driven;
        (b) determine for each of the pairs of the three phase coils respective values of a motor operating parameter;
        (c) compare the determined values of the motor operating parameter; and
        based on said comparison, adjust three-phase stationary reference frame motor control voltages $v_a$, $v_b$, $v_c$ to provide adjusted three-phase stationary reference frame motor control voltages $v'_a$, $v'_b$, $v'_c$;
        (d) iteratively repeat (a) to (c) until it is determined that the values of the motor operating parameter for each of the pairs of the three phase coils result in one of: the values of the motor operating parameter being equal; or the values of the motor operating parameter falling within predetermined thresholds or a predetermined threshold range.

12. The motor of claim 11, wherein the controller comprises a plurality of full-bridge inverters, wherein each full-bridge inverter has two output ends electrically connected to the two free ends of a corresponding phase coil, the controller being configured to operate the plurality of full-bridge inverters to output pulse modulated control signals to their respective phase coils; and wherein each full-bridge inverter has a current sense circuit connected to only one half of each said full-bridge inverter.

13. The motor of claim 12, wherein each of the current sense circuits respectively connected to only one half of their said full-bridge inverter is connected to a rotor position estimation module of the controller.

14. The motor of claim 12, wherein each of the current sense circuits is connected to a same respective half-side of their said full-bridge inverter.

15. A controller for a three-phase permanent magnet rotor motor comprising three phase coil windings, each phase coil winding having two free ends, the three phase coil windings being without a common node, the controller configured to:
    (a) drive the motor by applying motor control voltages in turn to respective pairs of the three phase coils with a remaining one of the three phase coils not being driven;
    (b) determine for each of the pairs of the three phase coils respective values of a motor operating parameter;
    (c) compare the determined values of the motor operating parameter; and
    based on said comparison, adjust three-phase stationary reference frame motor control voltages $v_a$, $v_b$, $v_c$ to provide adjusted three-phase stationary reference frame motor control voltages $v'_a$, $v'_b$, $v'_c$; and
    (d) iteratively repeat (a) to (c) until it is determined that the values of the motor operating parameter for each of the pairs of the three phase coils result in one of: the values of the motor operating parameter being equal; or the values of the motor operating parameter falling within predetermined thresholds or a predetermined threshold range.

16. A method of adjusting motor control voltages for a permanent magnet rotor motor comprising three phase coils, each phase coil having two free ends, the three phase coils being without a common node; the method comprising the steps of:
    driving the motor by applying motor control voltages in turn to respective pairs of the three phase coils with a remaining one of the three phase coils not being driven;
    determining for each of the pairs of the three phase coils respective values of a motor operating parameter;
    comparing the determined values of the motor operating parameter; and
    based on said comparison, adjusting three-phase stationary reference frame motor control voltages $v_a$, $v_b$, $v_c$ to provide adjusted three-phase stationary reference frame motor control voltages $v'_a$, $v'_b$, $v'_c$;
    wherein the method of adjusting the motor control voltages is a one-off method implemented after initiation of a start-up method of the motor and once the rotor has achieved a steady or constant speed of rotation and/or has reached a sufficient speed of rotor rotation to enable a position and speed estimation module of a motor controller to generate an estimated rotor angle θ.

17. A method of adjusting motor control voltages for a permanent magnet rotor motor comprising three phase coils, each phase coil having two free ends, the three phase coils being without a common node; the method comprising the steps of:

initiating a start-up operation of the motor;

using an estimated rotor angle θ to derive corresponding two-axis stationary reference frame voltages $v_\alpha$, $v_\beta$; and, based on the two-axis stationary reference frame voltages $v_\alpha$, $v_\beta$, generating three sets of three-phase stationary reference frame voltage waveforms Vbc, Vac, Vab for driving respective pairs of the three phase coils;

driving the motor by applying each set of three-phase stationary reference frame voltage waveforms Vbc, Vac, Vab as motor control voltages in turn to respective pairs of the three phase coils with a remaining one of the three phase coils not being driven;

determining for each of the pairs of the three phase coils respective values of a motor operating parameter by determining or measuring for each of said set of applied three-phase stationary reference frame voltage waveforms Vbc, Vac, Vab respective periods of rotation $t_{bc}$, $t_{ac}$, $t_{ab}$ of the rotor;

comparing the determined values of the motor operating parameter; and based on said comparison, adjusting three-phase stationary reference frame motor control voltages $v_a$, $v_b$, $v_c$ to provide adjusted three-phase stationary reference frame motor control voltages $v'_a$, $v'_b$, $v'_c$.

18. A method of adjusting motor control voltages for a permanent magnet rotor motor comprising three phase coils, each phase coil having two free ends, the three phase coils being without a common node; the method comprising the steps of:

initiating a start-up operation of the motor;

using an estimated rotor angle θ to derive corresponding two-axis stationary reference frame voltages $v_\alpha$, $v_\beta$; and, based on the two-axis stationary reference frame voltages $v_\alpha$, $v_\beta$, generating three sets of three-phase stationary reference frame voltage waveforms Vbc, Vac, Vab for driving respective pairs of the three phase coils;

driving the motor by applying each set of three-phase stationary reference frame voltage waveforms Vbc, Vac, Vab as motor control voltages in turn to respective pairs of the three phase coils with a remaining one of the three phase coils not being driven;

determining for each of the pairs of the three phase coils respective values of a motor operating parameter;

comparing the determined values of the motor operating parameter; and based on said comparison, adjusting three-phase stationary reference frame motor control voltages $v_a$, $v_b$, $v_c$ to provide adjusted three-phase stationary reference frame motor control voltages $v'_a$, $v'_b$, $v'_c$;

wherein three-phase stationary reference frame motor control voltages $v_a$, $v_b$, $v_c$ corresponding respectively to the three-phase stationary reference frame voltage waveforms Vbc, Vac, Vab for driving respective pairs of the three phase coils are determined from:

$Vbc$: $v_a=0$ $v_b=-\sqrt{3}v_\alpha+v_\beta$ $v_c=-\sqrt{3}v_\alpha-v_\beta$;

$Vac$: $v_a=\sqrt{3}v_\alpha-v_\beta$ $v_b=-\sqrt{3}v_\alpha+v_\beta$ $v_c=-2v_\beta-\sqrt{3}v_\alpha-v_\beta$; and $Vab$: $v_a=\sqrt{3}v_\alpha+v_\beta$ $v_b=\sqrt{2}v_\beta-\sqrt{3}v_\alpha+v_\beta$ $v_c=-\sqrt{3}v_\alpha-v_\beta$.

* * * * *